(12) United States Patent
Yang et al.

(10) Patent No.: US 10,160,829 B2
(45) Date of Patent: Dec. 25, 2018

(54) FUNCTIONALIZED POLYESTER POLYMERS AND FILM ARTICLES

(71) Applicant: 3M INNOVATIVE PROPERTIES COMPANY, St. Paul, MN (US)

(72) Inventors: Yu Yang, Eden Prairie, MN (US); Jiyoung Park, Woodbury, MN (US); Suresh S. Iyer, Woodbury, MN (US); Christopher W. A. Krohe, Minneapolis, MN (US); Kyle P. Starkey, Woodbury, MN (US); Timothy D. Fletcher, Lino Lakes, MN (US); Dong-Wei Zhu, North Oaks, MN (US); Thomas E. S. Muehle, Woodbury, MN (US); Jeffrey A. Peterson, Hugo, MN (US); Thomas J. Blong, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/743,939

(22) PCT Filed: Aug. 16, 2016

(86) PCT No.: PCT/US2016/047202
§ 371 (c)(1),
(2) Date: Jan. 11, 2018

(87) PCT Pub. No.: WO2017/031127
PCT Pub. Date: Feb. 23, 2017

(65) Prior Publication Data
US 2018/0201727 A1    Jul. 19, 2018

Related U.S. Application Data

(60) Provisional application No. 62/207,600, filed on Aug. 20, 2015.

(51) Int. Cl.
*C08G 63/12*    (2006.01)
*C08G 63/127*    (2006.01)
(Continued)

(52) U.S. Cl.
CPC ......... *C08G 63/6856* (2013.01); *C08G 63/54* (2013.01); *C08G 63/6926* (2013.01); *C08G 63/6956* (2013.01); *C08G 63/916* (2013.01); *C08G 69/44* (2013.01); *C08L 77/12* (2013.01); *B32B 7/12* (2013.01); *B32B 27/08* (2013.01); *B32B 27/32* (2013.01); *B32B 27/322* (2013.01); *B32B 27/36* (2013.01); *B32B 2250/02* (2013.01); *B32B 2327/12* (2013.01); *B32B 2327/18* (2013.01); *B32B 2367/00* (2013.01); *C08G 63/12* (2013.01); *C08G 63/127* (2013.01); *C08G 63/16* (2013.01); *C08G 63/18* (2013.01); *C08G 63/181* (2013.01); *C08G 63/685* (2013.01); *C08G 63/688* (2013.01); *C08G 63/6884* (2013.01); *C08G 63/6886* (2013.01); *C08G 63/692* (2013.01); *C08G 63/695* (2013.01); *C08G 63/91* (2013.01); *C08G 63/918* (2013.01);
(Continued)

(58) Field of Classification Search
None
See application file for complete search history.

(56) References Cited

U.S. PATENT DOCUMENTS

| 3,235,544 A | 2/1966 | Christena |
| 3,243,429 A | 3/1966 | Ham |

(Continued)

FOREIGN PATENT DOCUMENTS

| JP | 03183546 | 8/1991 |
| JP | 05-163335 A * | 6/1993 |

(Continued)

OTHER PUBLICATIONS

Fournier, ""Click" Chemistry as a Promising Tool for Side-Chain Functionalization of Polyurethanes", Macromolecules, 2008, vol. 41, No. 13, pp. 4622-4630.
Taguet, "Crosslinking of Vinylidene Fluoride-Containing Fluoropolymers", Advance Polymer Science, Jul. 2005, vol. 184, pp. 127-211.
Zhang, "Synthesis of a novel amphiphilic polymer containing nucleobases in the self-organized nanospheres", Journal of Polymer Research, 2010, vol. 17, No. 2, pp. 255-263, XP19771971.
International Search Report for PCT International Application No. PCT/US2016/047202, dated Dec. 14, 2016, 7 pages.

*Primary Examiner* — Vivian Chen
(74) *Attorney, Agent, or Firm* — Carolyn A. Fischer

(57) ABSTRACT

Polyester polymers are described comprising polymerized units comprising a hydroxy functional aromatic group wherein the hydroxy group has been functionalized with an adhesion promoting group. In some embodiments, the polyester polymer comprises polymerized units have the general structure (A) wherein $L_1$ and $L_2$ are independently divalent linking groups comprising an ester group; and $R_A$ is an adhesion promoting group bonded to the oxygen atom by means of an ionic or covalent bond. In other embodiments, film articles, laminates are described and methods of making functionalized polyester polymers are described.

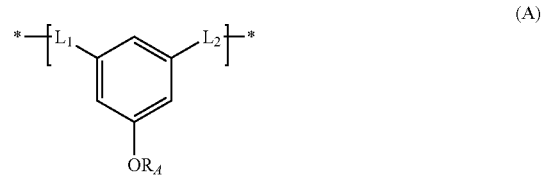

(A)

9 Claims, No Drawings

(51) Int. Cl.
| | | |
|---|---|---|
| *C08G 63/16* | (2006.01) | |
| *C08G 63/18* | (2006.01) | |
| *C08G 63/181* | (2006.01) | |
| *C08G 63/68* | (2006.01) | |
| *C08G 63/685* | (2006.01) | |
| *C08G 63/692* | (2006.01) | |
| *C08G 63/91* | (2006.01) | |
| *C08G 63/695* | (2006.01) | |
| *C08G 63/688* | (2006.01) | |
| *C08L 67/02* | (2006.01) | |
| *C08L 67/03* | (2006.01) | |
| *C08L 67/06* | (2006.01) | |
| *C08L 77/12* | (2006.01) | |
| *C09J 167/02* | (2006.01) | |
| *C09J 167/03* | (2006.01) | |
| *C09J 167/06* | (2006.01) | |
| *B32B 7/12* | (2006.01) | |
| *B32B 27/08* | (2006.01) | |
| *B32B 27/32* | (2006.01) | |
| *B32B 27/36* | (2006.01) | |
| *C08G 63/54* | (2006.01) | |
| *C08G 69/44* | (2006.01) | |

(52) U.S. Cl.
CPC ............ *C08L 67/02* (2013.01); *C08L 67/03* (2013.01); *C08L 67/06* (2013.01); *C08L 2203/16* (2013.01); *C09J 167/02* (2013.01); *C09J 167/03* (2013.01); *C09J 167/06* (2013.01); *Y10T 428/28* (2015.01); *Y10T 428/2843* (2015.01); *Y10T 428/2852* (2015.01); *Y10T 428/3154* (2015.04); *Y10T 428/31544* (2015.04); *Y10T 428/31786* (2015.04); *Y10T 428/31797* (2015.04)

(56) References Cited

U.S. PATENT DOCUMENTS

| | | | |
|---|---|---|---|
| 3,282,896 A | 11/1966 | Einberg | |
| 3,442,843 A | 5/1969 | Koberle | |
| 3,624,034 A | 11/1971 | Price | |
| 3,821,281 A | 6/1974 | Radlmann | |
| 3,929,934 A | 12/1975 | Moore | |
| 4,000,356 A | 12/1976 | Weisgerber | |
| 4,093,593 A | 6/1978 | Go | |
| 4,506,070 A * | 3/1985 | Ben | C08G 63/672 525/437 |
| 4,600,738 A * | 7/1986 | Lamm | C09J 167/06 523/500 |
| 4,609,606 A | 9/1986 | Noonan | |
| 4,622,182 A | 11/1986 | Hergenrother | |
| 4,801,736 A * | 1/1989 | Bagaglio | C08G 18/10 560/84 |
| 4,810,759 A | 3/1989 | Ryntz | |
| 4,880,700 A * | 11/1989 | Charmot | C08J 7/047 428/337 |
| 4,888,399 A * | 12/1989 | Ryntz | C08F 299/0485 525/127 |
| 5,214,100 A | 5/1993 | Abele | |
| 5,306,567 A * | 4/1994 | Kuo | C08G 63/60 428/482 |
| 5,340,521 A * | 8/1994 | Itoi | C07C 49/784 264/176.1 |
| 5,427,835 A | 6/1995 | Morrison | |
| 5,427,838 A | 6/1995 | Yamamoto | |
| 6,194,061 B1 * | 2/2001 | Satoh | B32B 27/08 428/341 |
| 6,281,278 B1 * | 8/2001 | Takase | B29B 7/007 523/200 |
| 6,657,016 B2 | 12/2003 | Yatsuka | |
| 7,015,269 B1 * | 3/2006 | Grutke | C08K 9/02 524/186 |
| 7,175,733 B2 | 2/2007 | Jing | |
| 7,235,302 B2 | 6/2007 | Jing | |
| 8,017,666 B2 | 9/2011 | Bissinger | |
| 2002/0099164 A1 | 7/2002 | Watterson | |
| 2004/0060635 A1 | 4/2004 | Diepers | |
| 2005/0208308 A1 | 9/2005 | Jing | |
| 2005/0228153 A1 | 10/2005 | Minabe | |
| 2006/0093826 A1 * | 5/2006 | Koeniger | C08K 5/0025 428/411.1 |
| 2008/0255312 A1 * | 10/2008 | Mielke | C08F 8/40 525/329.8 |
| 2009/0099267 A1 | 4/2009 | Kumar | |
| 2010/0234482 A1 | 9/2010 | Du Prez | |
| 2011/0152496 A1 | 6/2011 | Brainard | |
| 2012/0024352 A1 * | 2/2012 | DeBergalis | C08J 7/047 136/251 |
| 2012/0103516 A1 * | 5/2012 | Gentschev | C08G 18/10 156/329 |
| 2012/0123043 A1 | 5/2012 | Nakamura | |
| 2012/0328888 A1 * | 12/2012 | Kinzelmann | C08G 18/0852 428/458 |
| 2013/0017333 A1 * | 1/2013 | Feola | C08G 63/12 427/358 |
| 2013/0150548 A1 | 6/2013 | Drysdale | |
| 2015/0021274 A1 * | 1/2015 | Arts | B03D 3/06 210/735 |

FOREIGN PATENT DOCUMENTS

| | | |
|---|---|---|
| JP | 05-287174 A * | 11/1993 |
| JP | 07-247260 A * | 9/1995 |
| JP | 2012032458 | 2/2012 |
| WO | WO 2000-12574 | 3/2000 |
| WO | WO 2000-77070 | 12/2000 |
| WO | WO 2002-094912 | 11/2002 |
| WO | WO 2014-179432 | 11/2014 |
| WO | WO 2017-100056 | 6/2017 |

\* cited by examiner

FUNCTIONALIZED POLYESTER POLYMERS AND FILM ARTICLES

CROSS REFERENCE TO RELATED APPLICATIONS

This application is a national stage filing under 35 U.S.C. 371 of PCT/US2016/047202, filed Aug. 16, 2016, which claims the benefit of U.S. Provisional Application No. 62/207,600, filed Aug. 20, 2015, the disclosure of which is incorporated by reference in its/their entirety herein.

SUMMARY

In one embodiment a polyester polymer is described comprising polymerized units comprising a hydroxy functional aromatic group wherein the hydroxy group has been functionalized with an adhesion promoting group.

In some embodiments, the polyester polymer comprises polymerized units have the general structure

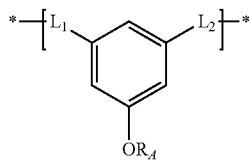

wherein $L_1$ and $L_2$ are independently divalent linking groups comprising an ester group; and $R_A$ is an adhesion promoting group bonded to the oxygen atom by means of an ionic or covalent bond.

In another embodiment, an (e.g. aliphatic or aromatic) polyester polymer is described comprising polymerized units having the general structure

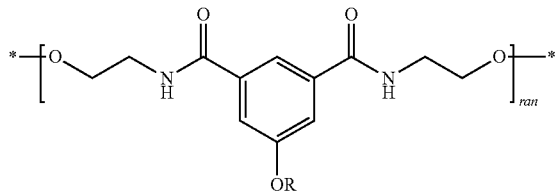

wherein R is H or an adhesion promoting group ($R_A$) bonded to the oxygen atom by means of an ionic or covalent bond. The subscript "ran" refers to the polymerized unit being randomly distributed throughout the polyester polymer.

In other embodiments, film articles and laminates are described.

In other embodiments, methods of making functionalized polyester polymers are described.

In one embodiment, the method of making the polyester polymer comprises providing a polyester polymer intermediate comprising polymerized units of a hydroxy-functional aromatic group; reacting the hydroxy-functional aromatic group with a functionalization compound having the formula $R_{OH}$—$R_A$, wherein $R_{OH}$ is a hydroxy-reactive group and $R_A$ is an adhesion-promoting group.

In one embodiment, the method of making the polyester polymer comprises providing at least one carboxylic acid, ester thereof, or polyol comprising a hydroxy-functional aromatic group; reacting the hydroxy-functional aromatic group with a functionalization compound having the formula $R_{OH}$—$R_A$, wherein $R_{OH}$ is an hydroxy-reactive group and $R_A$ is an adhesion-promoting group thereby forming a functionalized carboxylic acid, ester thereof, or polyol; and incorporating the functionalized carboxylic acid, ester thereof, or polyol into a polyester polymer by transesterification and polycondensation.

DETAILED DESCRIPTION

In one embodiment a polyester polymer is described. The polyester polymer comprises polymerized units comprising a hydroxy functional aromatic group wherein the hydroxy group has been functionalized with an adhesion promoting group.

The polyester polymer is generally prepared by the reaction of conventional dicarboxylic acids with conventional polyols, and at least one aromatic carboxylic acid or polyol (e.g. diol) comprising a hydroxy-functional aromatic group. The hydroxy-functional aromatic group is reacted with a functionalization compound.

Typical aromatic dicarboxylic acids include terephthalic acid, isophthalic acid, and o-phthalic acid; aliphatic dicarboxylic acids such as succinic acid, glutaric acid, adipic acid, azelaic acid, sebacic acid, dodecanedicarboxylic acid and dimeric acid; and alicyclic dicarboxylic acids such as 1,4-cyclohexanedicarboxylic acid and 1,3-cyclohexanedicarboxylic acid.

In some embodiments, at least 50, 60, 70, 80, or 90 wt-% of the carboxylate polymerized units of the polyester polymer are aromatic carboxylate units. In some embodiments, the polyester polymer comprises polymerized units derived from terephthalic acid or in other words terephthalate units in an amount of at least 15, 16, 17, 18, 19, 20, 21, 22, 23, 24, or 25 wt.-% and typically no greater than 40, 39, 38, 37, 36, 35, 34, 33, 32, 31, or 30 wt.-% based on the total weight of the polyester polymer. In some embodiments, the polyester polymer comprises polymerized units derived from isophthalic acid or in other words isophthalate units in an amount of at least 5, 6, 7, 8, 9 or 10 wt.-% and typically no greater than 40, 39, 38, 37, 36, or 35 wt.-% based on the total weight of the polyester polymer. In some embodiments, the polyester polymer comprises polymerized units derived from isophthalic acid in an amount of at least 5, 6, 7, 8, 9 or 10 wt.-%. In other embodiments, the polyester polymer comprises polymerized units derived from isophthalic acid in an amount of at least 15, 16, 17, 18, 19, 20, 21, 22, 23, 24, or 25 wt.-%.

In some embodiments, the polyester polymer comprises aromatic carboxylate units in combination with aliphatic carboxylate units. In some embodiments, the polyester polymer comprises polymerized units derived from sebacic acid in an amount of at least 15, 16, 17, 18, 19 or 20 wt-% and typically no greater than 30, 29, 28, 27, 26, or 25 wt.-% based on the total weight of the polyester polymer. In some embodiments, the polyester polymer comprises polymerized units derived from azelic acid in an amount of at least 5, 6, 7, 8, 9 or 10 wt.-% and typically no greater than 20, 19, 18, 17, 16, or 15 wt.-% based on the total weight of the polyester polymer.

Any of the aforementioned dicarboxylic acid groups may be substituted with an ionic group in order to provide the pendant ionic groups. The pendant ionic groups may be introduced by grafting them onto side chains of a polyester, capping as end groups of a polyester, or including monomers having pendant ionic groups during polymerization to form the first polyester. The pendant ionic groups may be anionic or cationic. Examples of anionic groups include sulfonate, phosphonate, or carboxylate groups, or a combination thereof. Examples of cationic groups include ammonium and sulfonium groups. The first dicarboxylate monomer having the pendant ionic group may comprise one or more dicarboxylate monomers having the same or different pendant ionic groups. Each pendant ionic group is associated with a counterion which may be an inorganic or an organic counterion. Examples of inorganic counterions include sodium, potassium, lithium, zinc, magnesium, calcium, cobalt, iron, aluminum, or antimony counterions, or a combination thereof. Examples of organic counterions include C2-C20 compounds, especially carboxylates. Preferred organic counterions include citrates, malates, malonates, maleates, adipates, succinates, acetates, propionates, lactates, tartrates, glycolates and combinations thereof. A useful first dicarboxylate monomer with a pendant ionic group comprises a salt of 5-sulfoisophthalate such as sodium 5-sulfoisophthalate.

In some embodiments, the polyester polymer comprises pendent ionic groups such as a salt of 5-sulfoisophthalate. The polyester polymer comprises polymerized units of pendent ionic groups such as a salt of 5-sulfoisophthalate in an amount of at least 1, 2, 3, 4, or 5 wt.-% and typically no greater than 10 wt.-% based on the total weight of the polyester polymer.

Typical glycol components include ethylene glycol, 1,2-propylene glycol, 1,3-propylene glycol, 1,4-butanediol, 1,3-butanediol, 1,5-pentanediol, 1,6-hexanediol, 3-methyl-1,5-pentanediol, neopentyl glycol, 2-ethyl-2-butyl-1,3-propanediol, diethylene glycol, 1,4-cyclohexanedimethanol, an adduct of bisphenol A with ethylene oxide, an adduct of bisphenol A with propylene oxide and polyether glycol such as polyethylene glycol, polypropylene glycol and polytetramethylene glycol.

In some embodiments, at least 50, 60, 70, 80, or 90 wt.-% of the glycol polymerized units of the polyester polymer are aliphatic units derived from a straight-chain or branched $C_2$-$C_5$ diol. The glycol polymerized units may be derived from a single glycol such as ethylene glycol, as well as combinations thereof. In some embodiments, glycol polymerized units are derived from ethylene glycol and neopentyl glycol. In other embodiments, glycol polymerized units are derived from ethylene glycol and butane diol glycol.

In some embodiment, the polyester polymer comprises glycol polymerized units derived from more than one glycol. In some embodiments, the polyester polymer comprises polymerized units derived from ethylene glycol in an amount of at least 5, 6, 7, 8, 9 or 10 wt.-% and typically no greater than 30, 25, 20, or 15 wt.-% based on the total weight of the polyester polymer. In some embodiments, the polyester polymer comprises polymerized units derived from neopentyl glycol in an amount of at least 10, 11, 12, 13, 14 or 15 wt.-% and typically no greater than 35, 34, 33, 32, 31, 30, 29, 28, 27, 26 or 25 wt.-% based on the total weight of the polyester polymer. In some embodiments, the polyester polymer comprises polymerized units derived from butane diol in an amount of at least 5, 6, 7, 8, 9 or 10 wt.-% and typically no greater than 20, 19, 18, 17, 16 or 15 wt.-% based on the total weight of the polyester polymer.

In one embodiment, the method of making a polyester polymer described herein generally comprises providing a carboxylic acid, ester thereof, or polyol (e.g. diol) comprising a hydroxy-functional aromatic group and reacting the hydroxy-functional group with a functionalization compound having the formula $R_{OH}$—$R_A$, wherein $R_{OH}$ is a hydroxy-reactive group and $R_A$ is an adhesion-promoting group. The method further comprises incorporating the functionalized carboxylic acid, ester thereof, or polyol (e.g. diol) into a polyester polymer by transesterification and polycondensation.

In another typically favored embodiment, the method of making the polyester polymer described herein generally comprises providing a polyester polymer comprising polymerized units comprising a hydroxy-functional aromatic group. The hydroxy substituent is typically covalently bonded to an aromatic ring. The hydroxy-functional polyester polymer can be characterized as a polyester polymer intermediate. The method further comprises reacting the hydroxy substituent of the aromatic group (e.g. aromatic ring) with a functionalization compound having the formula $R_{OH}$—$R_A$ wherein $R_{OH}$ is a hydroxy-reactive group and R is an adhesion-promoting group, as will subsequently be described.

In some embodiments, the polyester polymer intermediate can be prepared by polymerizing conventional dicarboxylic acid(s) and glycol(s), as just described; and at least one carboxylic acid and/or glycol that comprises a hydroxy-functional aromatic group.

In other embodiments, the polyester polymer intermediate is prepared by transesterification and polycondensation of a prepolymerized polyester polymer and a hydroxy-functional aromatic carboxylic acid, ester thereof; or a hydroxy-functional aromatic polyol (e.g. diol).

Various commercially available polyester polymers can be utilized as the prepolymerized polyester polymer. In some embodiments, the prepolymerized polyester polymer is provided in a solution such as in the case of solvent borne thermoplastic polyesters available from SK Chemical, Korea under the trade designation "SKYBON" and copolyester solutions available from Bostik, Inc., Wauwatosa, Wis. under the trade designation "VITEL".

In some embodiments, the polyester polymer is an aqueous sulfopolyester such as described in U.S. Pat. No. 5,427,838; incorporated herein by reference.

Sulfopolyesters can be described by the following formula:

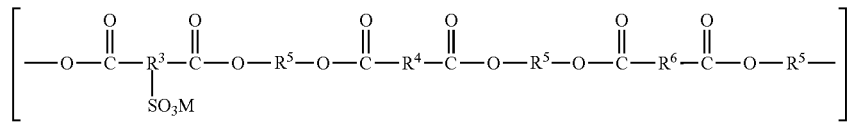

M is an alkali metal cation such as sodium, potassium, or lithium; or suitable tertiary, and quaternary ammonium cations having 0 to 18 carbon atoms, such as ammonium, hydrazonium, N-methyl pyridinium, methylammonium, butylammonium, diethylammonium, triethylammonium, tetraethylammonium, and benzyltrimethylammonium.

$R^3$ is an arylene or aliphatic group incorporated in the sulfopolyester by selection of suitable sulfo-substituted dicarboxylic acids such as sulfoalkanedicarboxylic acids including sulfosuccinic acid, 2-sulfoglutaric acid, 3-sulfoglutaric acid, and 2-sulfododecanedioic acid; and sulfoarenedicarboxylic acids such as 5'-sulfoisophthalic acid, 2-sulfoterephthalic acid, 5-sulfonapthalene-1,4-dicarboxylic acid; sulfobenzylmalonic acid esters such as those described in U.S. Pat. No. 3,821,281; sulfophenoxymalonate such as described in U.S. Pat. No. 3,624,034; and sulfofluorenedicarboxylic acids such as 9,9-di-(2'-carboxyethyl)-fluorene-2-sulfonic acid. It is to be understood that the corresponding lower alkyl carboxylic esters of 4 to 12 carbon atoms, halides, anhydrides, and sulfo salts of the above sulfonic acids can also be used.

$R^4$ is optionally independently incorporated in the sulfopolyester by the selection of one or more suitable arylene dicarboxylic acids, or esters or amides thereof as described herein corresponding acid chlorides, anhydrides, or lower alkyl carboxylic esters of 4 to 12 carbon atoms. Suitable acids include the phthalic acids (orthophthalic, terephthalic, isophthalic), 5-t-butyl isophthalic acid, diphenic acid, oxydibenzoic acid, anthracene dicarboxylic acids, and the like. Examples of suitable esters or anhydrides include dimethyl isophthalate or dibutyl terephthalate, and phthalic anhydride.

$R^5$ is independently incorporated in the sulfopolyester by the selection of one or more suitable diols including straight or branched chain alkylenediols having the formula $HO(CH_2)_cOH$ in which c is an integer of 2 to 12 and oxaalkylenediols having a formula $H-(OR^5)_d-OH$ in which $R^5$ is an alkylene group having 2 to 4 carbon atoms and d is an integer of 1 to 6, the values being such that there are no more than 10 carbon atoms in the oxaalkylenediol. Examples of suitable diols include ethyleneglycol, propyleneglycol, 1,5-pentanediol, 1,6-hexanediol, 1,8-octanediol, 1,10-decanediol, 2,2-dimethyl-1,3-propanediol, 2,2-diethyl-1,3-propanediol, 3-methyl-1,5-pentanediol, diethyleneglycol, dipropyleneglycol, diisopropyleneglycol, and the like. Also included are suitable cycloaliphatic diols such as 1,4-cyclohexanedimethanol, 1,3-cyclohexanedimethanol, and the like. Suitable polyester or polyether polyols may also be used such as polycaprolactone, polyneopentyl adipate, or polyethyleneoxide diols up to 4000 in molecular weight, and the like; generally these polyols are used in conjunction with lower molecular weight diols such as ethylene glycol if high molecular weight polyesters are desired.

$R^6$ is optionally independently incorporated in the sulfopolyester by the selection of suitable aliphatic or cycloaliphatic dicarboxylic acids or corresponding acid chlorides, anhydrides or ester derivatives; such as acids having the formula $HOOC(CH_2)_eCOOH$, wherein e is an integer having an average value of 2 to 8 (e.g. succinic acid, adipic acid, maleic acid, glutaric acid, suberic acid, sebacic acid, and the like). Suitable cycloaliphatic acids include cyclohexane-1,4-dicarboxylic acid, and the like.

The sulfopolyester typically contains at least one of $R^4$ or $R^6$. Further, the sulfopolyester may contain more than one type of $R^3$, $R^4$, $R^5$ or $R^6$. For example, in some embodiments, the sulfopolyester independently comprises $R^4$ groups derived from terephthalic acid and isophthalic acid and independently comprises $R^5$ groups derived from ethylene glycol and neopentyl glycol.

In some embodiments, a sulfopolyester polymer intermediate can be prepared by transesterification and polycondensation of the sulfopolyester, just described, with a hydroxy-functional aromatic carboxylic acid, ester thereof, or polyol (e.g. diol); and functionalization of the hydroxy group. Alternatively a hydroxy-functional aromatic carboxylic acid, ester thereof, or polyol (e.g. diol) can be included in the synthesis of the sulfopolyester.

The sulfopolyesters can be prepared by standard techniques, typically involving the reaction of dicarboxylic acids (or diesters, anhydrides, etc. thereof) with monoalkylene glycols and/or polyols in the presence of acid or metal catalysts (e.g., antimony trioxide, zinc acetate, p-toluene sulfonic acid, etc.), utilizing heat and pressure as desired. Normally, an excess of the glycol is supplied and removed by conventional techniques in the later stages of polymerization. When desired, a hindered phenol antioxidant may be added to the reaction mixture to protect the polyester from oxidation. To ensure that the ultimate polymer will contain more than 90 mole % of the residue of monoalkylene glycols and/or polyols, a small amount of a buffering agent (e.g. sodium acetate, potassium acetate, etc.) is added.

In some embodiments, the prepolymerized polyester polymer has a number average molecular weight (Mn) of at least about 1,000, 2,000, 3,000 or 5,000 g/mole. In some embodiments, the prepolymerized polyester polymer has a number average molecular weight no greater than 75,000, 50,000, 25,000, 20,000, 15,000, or 10,000 g/mole.

In some embodiments, the prepolymerized polyester polymer has a weight average molecular weight (Mw) of at least about 10,000, 2,000, 30,000, 40,000 or 50,000 g/mole. In some embodiments, the prepolymerized polyester polymer has a weight average molecular weight no greater than 150,000 or 100,000 g/mole. In some embodiments, the prepolymerized polyester polymer has a weight average molecular weight no greater than 75,000, 50,000, or 25,000 g/mole.

In some embodiments, the prepolymerized polyester polymer has a polydispersity of at least 5 or 10 ranging up to about 30.

In some embodiments, the prepolymerized polyester polymer has a glass transition temperature as measured by DSC of at least about 15° C. and in some embodiments at least 20 or 25° C. In some embodiments, the prepolymerized polyester polymer has a glass transition temperature of at least about 30, 35, 40, 45, 50, 55, 60 or 65° C.

Incorporation of the hydroxy-functional aromatic carboxylic acid or hydroxy-functional aromatic diol at low concentrations (e.g. ranging up to about 5 wt.-%) typically raises the Tg of the polyester polymer intermediate by about 5 to 15° C.

Incorporation of the hydroxy-functional aromatic carboxylic acid or hydroxy-functional aromatic diol can reduce the number average molecular weight and increase the polydispersity. In one embodiment, the polydispersity is increases from about 5 to about 25, or in other words increases by 500%. In another embodiment, the polydispersity is increases from about 30 to about 50, or in other words increases by 150% to 200%. However, in other embodiments, the number average molecular weight and polydispersity are substantially unchanged by incorporation of the hydroxy-functional aromatic carboxylic acid or hydroxy-functional aromatic diol. Thus, the polyester polymer intermediate can have any of the previously stated number average molecular weight and polydispersity ranges.

The weight average molecular weight of polyester polymer intermediate can increase, decrease, or remain substantially the same. Thus, the polyester polymer intermediate can have the previously stated weight average molecular weight ranges.

In some embodiments, the compound utilized in the synthesis of the polyester that provide the hydroxy-functional aromatic group is a carboxylic acid. Examples of specific monocarboxylic and dicarboxylic compounds include diphenolic acid, hydroxybenzoic acid, hydroxyphenylacetic acid, hydroxy-phenylpropionic acid, hydroxyisophthalic acid, and salicylic acid; depicted as follows:

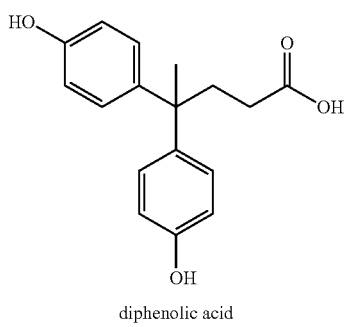

diphenolic acid

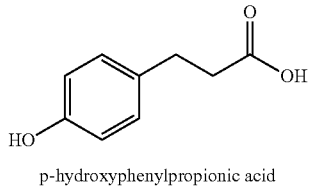

p-hydroxybenzoic acid p-hydroxylphenylacetic acid

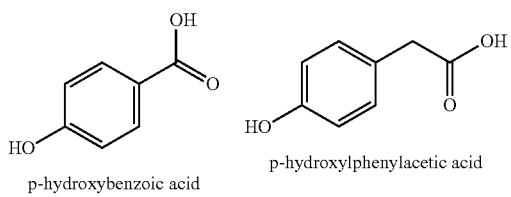

p-hydroxyphenylpropionic acid

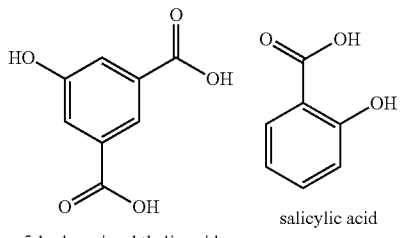

5-hydroxyisophthalic acid salicylic acid

In other embodiments, esters or anhydrides of such carboxylic acids can be used.

When the hydroxy-functional aromatic group is provide by a dicarboxylic acid, the polyester polymer intermediate comprises polymerized units having the general structure

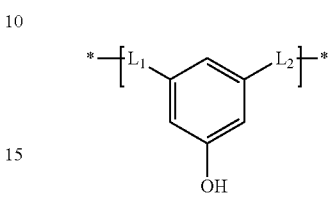

wherein $L_1$ and $L_2$ are independently divalent linking groups comprising an ester group.

When the hydroxy-functional aromatic group is provide by a monocarboxylic acid, the polyester polymer chains are generally endcapped with the hydroxy-functional aromatic group rather than the polyester polymer having the hydroxy-functional aromatic groups randomly distributed within the backbone of the polyester polymer.

In one embodiment, the polyester polymer intermediate is prepared by reacting at least one (e.g. aromatic) dicarboxylic acid lacking hydroxyl functionality, such as terephthalic acid (A) alone or in combination with isophthalic acid (B); and at least one hydroxy-functional aromatic carboxylic acid (e.g. 5-hydroxyisophthalic acid (C)) with at least one glycol, such as ethylene glycol (D) and neopentyl glycol (E). In this embodiment, the hydroxy-functional aromatic ring is bonded to the polyester backbone by mean of an ester linking group. One illustrative reaction scheme is as follows:

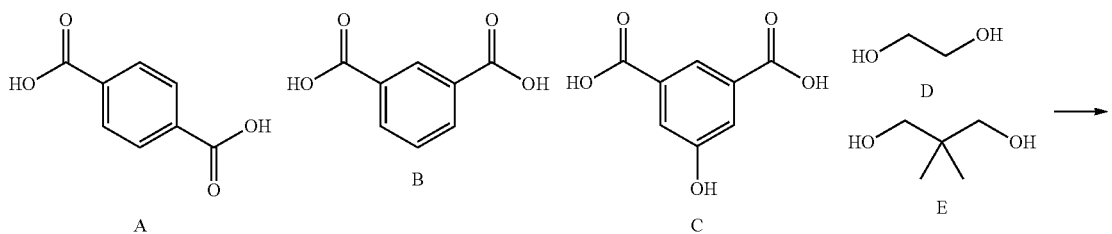

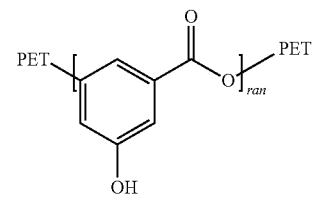

In this embodiment, PET refers to polyethylene terephthalate. However, in other embodiments, the polyester polymer may be derived from aliphatic dicarboxylic acids. Thus, in each of the reaction schemes depicted throughout the application PET refers generally to aromatic or aliphatic polyester polymer unless specified otherwise.

In another embodiment, the polyester polymer intermediate is prepared by reacting an aromatic carboxylic acid comprising a hydroxy substituent (e.g. 5-hydroxyisophthalic acid (A)) and a glycol such as butane diol (B) with a prepolymerized polyester polymer (e.g. VITEL 2200B). One illustrative reaction scheme is as follows:

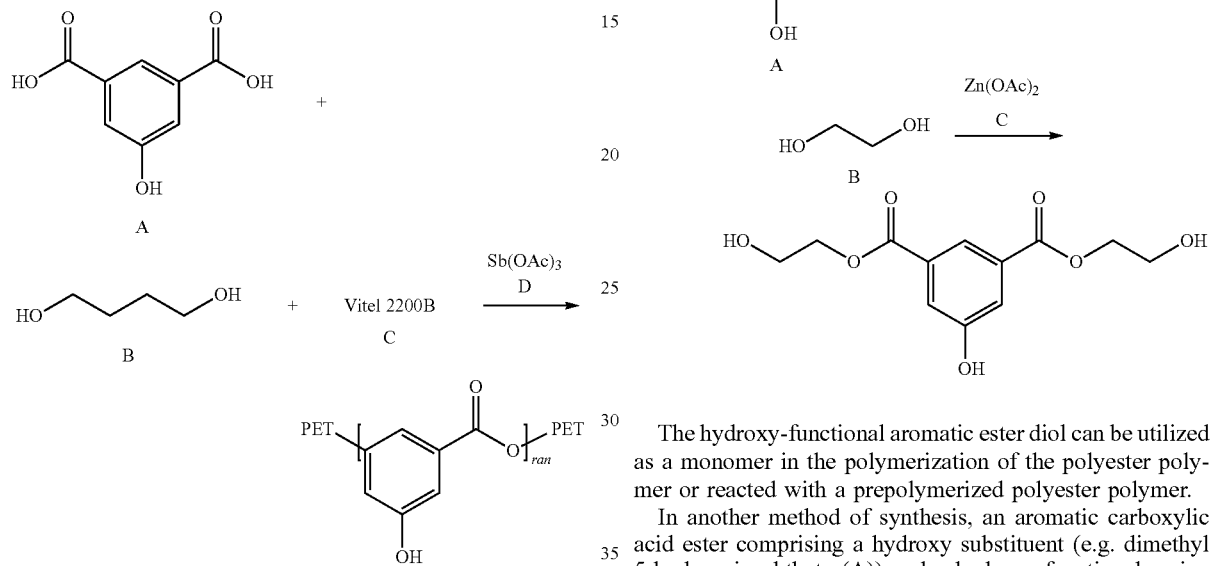

In other embodiments, the compound utilized in the synthesis of the polyester that provides the hydroxy-functional aromatic group is a polyol. Although 2,6-bis(hydroxymethyl)-p-cresol was found not to incorporate into a prepolymerized polyester in a satisfactory manner, other polyols (e.g. diols) that comprise a hydroxy-functional aromatic group can be synthesized. For example, an aromatic dicarboxylic acid or ester thereof comprising a hydroxy substituent (e.g. 5-hydroxyisophthalic acid or dimethyl 5-hydroxyisophthate (A)) and a glycol such as ethylene diol (B) can be reacted to form a hydroxy-functional aromatic ester diol as depicted in the following reaction schemes:

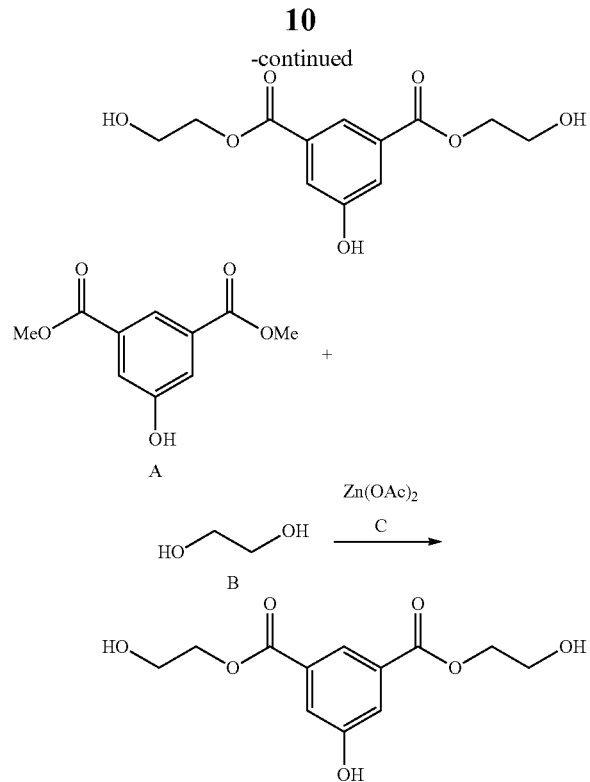

The hydroxy-functional aromatic ester diol can be utilized as a monomer in the polymerization of the polyester polymer or reacted with a prepolymerized polyester polymer.

In another method of synthesis, an aromatic carboxylic acid ester comprising a hydroxy substituent (e.g. dimethyl 5-hydroxyisophthate (A)) and a hydroxy functional amine such as ethanolamine (B) can be reacted to form a hydroxy-functional aromatic amide diol (C). The hydroxy-functional aromatic amide diol (C) can then be reacted with a prepolymerized polyester polymer (e.g. SKYBON ES-365 (D)) or utilized as a monomer in the polymerization of the polyester polymer.

One illustrative reaction scheme is as follows:

STEP 1

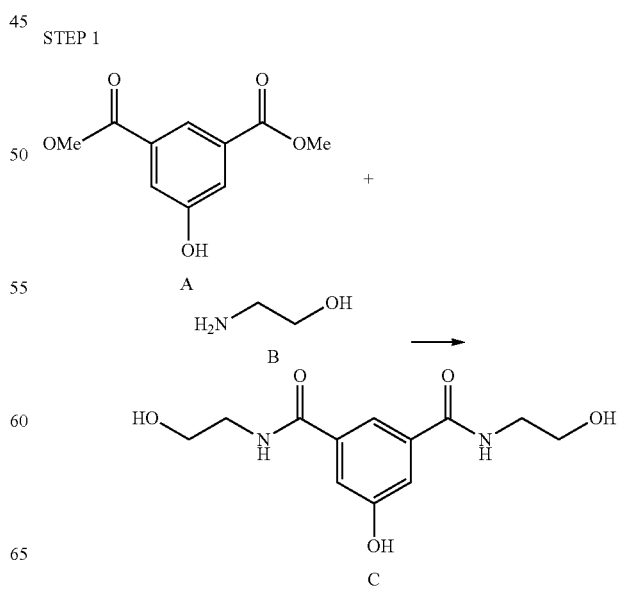

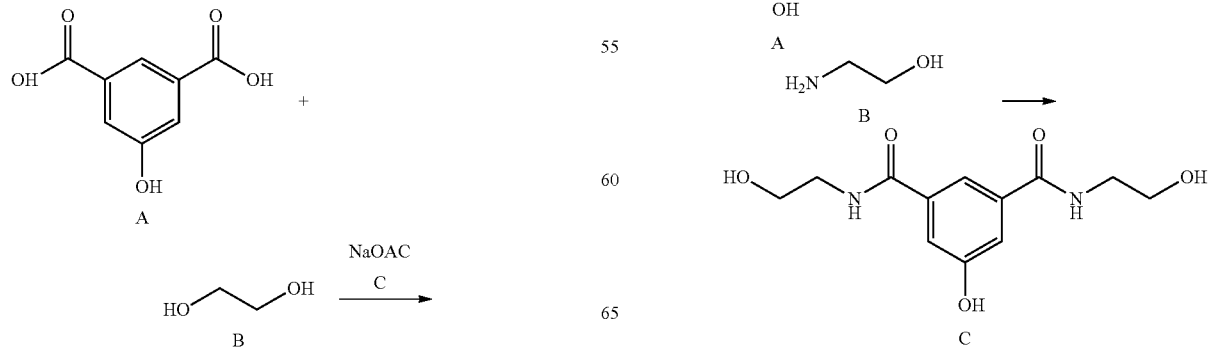

STEP 2

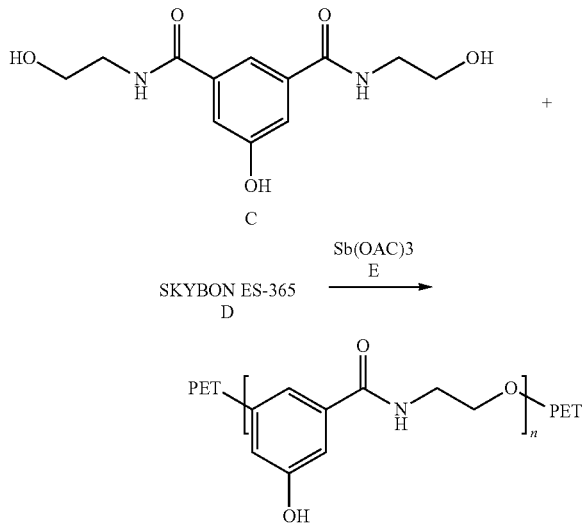

In another method of synthesis, an aromatic carboxylic acid comprising a hydroxy substituent (e.g. 5-hydroxyisophthalic acid (A) can be chain extended with a glycol such as ethylene glycol (B) to form a mixture of hydroxy-functional aromatic diols (D). Such mixture of diols is combined with a prepolymerized polyester polymer or utilized as a monomer in the polymerization of the polyester polymer. One illustrative reaction scheme is as follows:

STEP 1

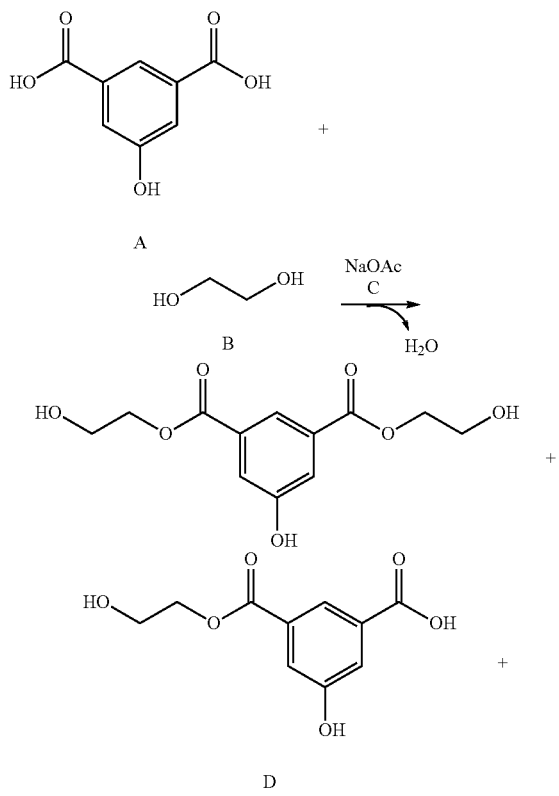

STEP 2

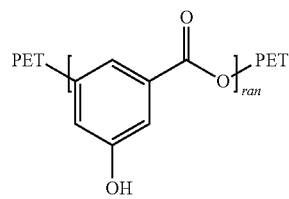

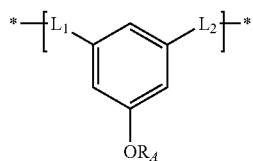

Various other aromatic carboxylic acids comprising a hydroxy substituent or derivatives thereof, as well as various other glycols can be used in the various reaction schemes described above.

In typical reaction schemes, the hydroxy substituent of the aromatic group of the polyester polymer intermediate is reacted with a functionalization compound having the formula $R_{OH}$—$R_A$ wherein $R_{OH}$ is a hydroxy-reactive group and $R_A$ is an adhesion-promoting group. In typical embodiments, a single functionalization compound is utilized. However, a combination of two or more functionalization compounds can also be used.

In some embodiments, the functionalized polyester polymer comprises polymerized units having the general structure $$*{-}{\left[\!L_1{-}\!\!\bigcirc\!\!{-}L_2\right]}{-}*$$
$$\quad\quad\quad\quad OR_A$$

wherein $L_1$ and $L_2$ are independently divalent linking groups comprising an ester group; and $R_A$ is an adhesion promoting group bonded to the oxygen atom by means of an ionic or covalent bond. In some embodiments, $L_1$ and $L_2$ are independently divalent linking groups comprising an amide and an ester group.

Regardless of the manner of synthesis, the polyester polymer comprises a sufficient concentration of polymerized units comprising the adhesion promoting group to achieve the desired properties. The polyester polymer typically comprises at least 0.1, 0.5, 1, 1.5, or 2 wt.-% of polymerized units comprising the adhesion promoting group. In some embodiments, the polyester polymer typically comprises no greater than 25, 20, or 15 wt.-% of polymerized units comprising the adhesion promoting group. In some embodiments, the polyester polymer intermediate typically comprises no greater than 10, 9, 8, 7, 6, or 5 wt.-% of polymerized units comprising the adhesion promoting.

In typical embodiments, substantially all the hydroxyl groups of the polyester polymer intermediate are converted to an adhesion promoting group. Thus, the hydroxy content of the functionalized polyester polymer is typically no greater than 2, 1, 1.5, 1, 0.5, 0.1, 0.005, or 0.0001 wt.-% of the functionalized polyester polymer.

Various functionalization compounds can be utilized depending on the intended use of the polyester polymer. In some embodiments, the polyester polymer is utilized as a primer and the functionalization compound is chosen based on the type of material (e.g. substrate) the polyester polymer will subsequently be bonded. In other embodiments, the polyester polymer is a film and the functionalization compound is chosen based on the type of material that may be disposed upon the film.

In some embodiments, the functionalization compound is a strong base. Strong organic bases include for example amines, N-heterocyclic compounds, tetraalkylammonium and phosphonium hydroxides, metal alkoxides and amides. Some illustrative examples of strong organic bases are terta-n-butyl phosphonium hydroxide and amines, such as 1,8-diazabicyclo[5.4.0]undec-7-ene (DBU), 1,5-Diazabicyclo[4.3.0]non-5-ene (DBN), triethyl amine, N-ethyldiisopropylamine, piperidine, diethyl amine, 4-(dimethylamino) pyridine, 1,4-diazabicyclo[2.2.2]octane (DABCO™), and tetramethyl ammonium hydroxide. Inorganic bases such as metal hydroxide, metal carbonate and the like can also be utilized as the functionalization compound.

Upon reacting the strong base with the hydroxyl group of the hydroxyl functional aromatic group, a salt is formed wherein the resulting adhesion promoting group is typically a cation of the salt of a strong base. In some embodiments, the adhesion promoting group is a N-heterocyclic cation or an organoammonium cation. Illustrative reaction schemes of the functionalization of the hydroxy substituent of the aromatic group of the polyester polymer are depicted as follows:

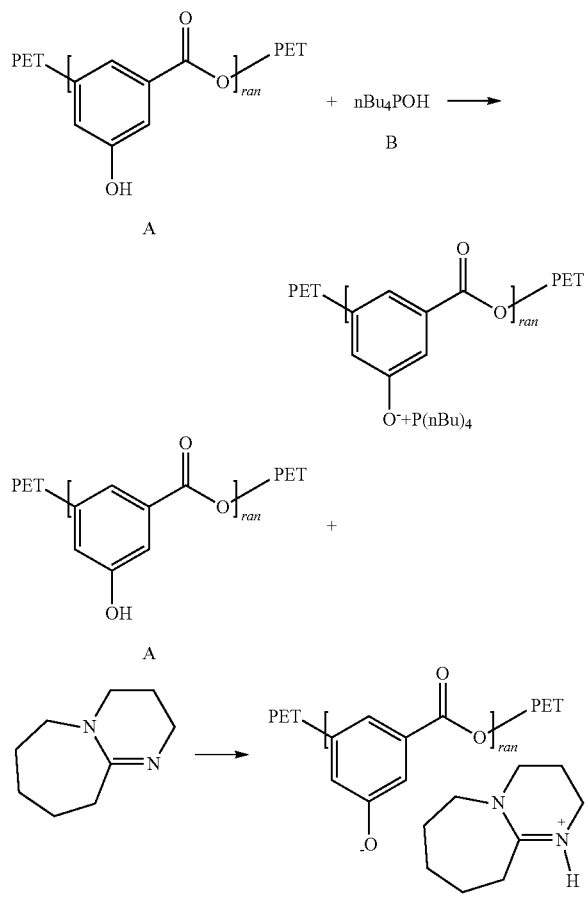

Throughout the present application the subscript "ran" refers to the polymerized unit randomly distributed in the polyester polymer.

In other embodiments, the functionalization compound is an aziridine compound.
that comprises at least one aziridine group. In some embodiments, the aziridine compound may comprise 2, 3, 4, 5, 6, or greater than 6 aziridine groups.

As depicted in the following reaction scheme, when the aziridine compound comprises a single aziridine group such as 2-methylaziridine (B), upon reacting with the hydroxy-substituted aromatic group of the polyester (A), the adhesion promoting group comprises an amine.

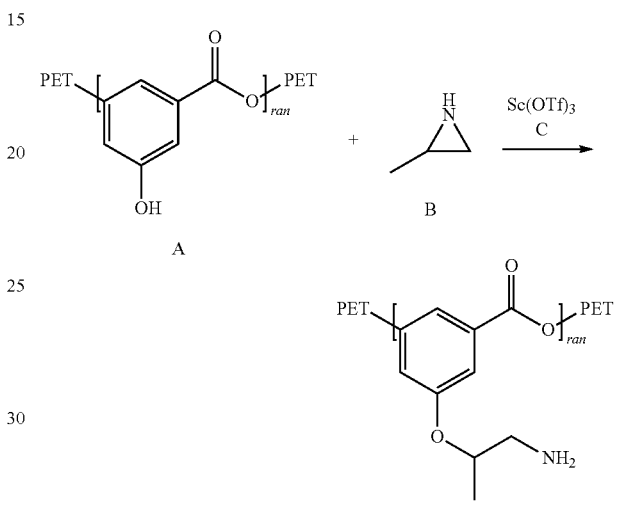

When the aziridine compound comprises more than one aziridine group, upon reacting with the hydroxyl-substituted aromatic group, the adhesion promoting group comprises one or more aziridine groups.

The aziridine compound may be represented by the following structure:

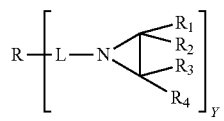

wherein with respect to this aziridine compound
R is a core moiety having a valency of Y;
L is a bond, divalent atom, or divalent linking group;
$R_1$, $R_2$, $R_3$, and $R_4$ are independently hydrogen or a $C_1$-$C_4$ alkyl (e.g. methyl); and
Y is typically 2, 3, or greater.

In some embodiments, R is —$SO_2$—. In some embodiments, R-L is a residue of a multi(meth)acrylate compound. In some embodiments L is a $C_1$-$C_4$ alkylene, optionally substituted with one or more (e.g. contiguous or pendant) oxygen atoms thereby forming ether or ester linkages. In typical embodiments, $R_1$ is methyl and $R_2$, $R_3$, and $R_4$ are hydrogen.

Representative aziridine compounds include trimethylolpropane tri-[beta-(N-aziridinyl)-propionate, 2,2-bishydroxymethyl butanoltris[3-(1-aziridine) propionate]; 1-(aziridin-2-yl)-2-oxabut-3-ene; and 4-(aziridin-2-yl)-but-1-ene; and 5-(aziridin-2-yl)-pent-1-ene.

In some embodiments, a polyaziridine compound can be prepared by reacting divinyl sulfone with alkylene (e.g.

ethylene) imine, such as described in U.S. Pat. No. 3,235,544. On representative compound is di(2-propyleniminoethyl)sulfone, as depicted as follows:

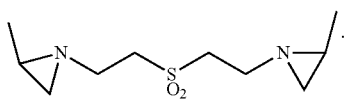

Polyaziridine compounds can be prepared via a Michael addition of a multi(meth)acrylate compound with an (e.g. $C_1$-$C_4$ alkyl) aziridine, such as 2-methyl aziridine (also known as 2-methyl ethylenimine). Suitable multi(meth)acrylate compounds comprise at least two and is some embodiments at least 3, 4, 5, or 6 (meth)acrylate functional groups. Representative multi(meth)acrylate compounds typically comprise at least two (meth)acrylate groups including for example hexanediol acrylate (HDDA), pentaerythritol tri(meth)acrylate, pentaerythritol tetra(meth)acrylate, trimethylolpropane tri(methacrylate), dipentaerythritol penta(meth)acrylate, dipentaerythritol hexa(meth)acrylate ("SR444"), trimethylolpropane ethoxylate tri(meth)acrylate, glyceryl tri(meth)acrylate, pentaerythritol propoxylate tri(meth)acrylate, and di(trimethylolpropane) tetra(meth)acrylate. In such reactions each (meth)acrylate group provides a site for addition of the aziridine group and the remaining multi(meth)acrylate starting compound. Thus, R-L is a residue (i.e. recognizable part) of the multi(meth)acrylate compound. Some representative polyaziridine compounds that can be prepared via a Michael addition are as follows:

In some embodiments, the polyaziridine compound lacks hydrolyzable (e.g. linking) groups, such as linking groups comprising an ester group. One representative compound, in which the synthesis is described in the forthcoming examples, is as follows:

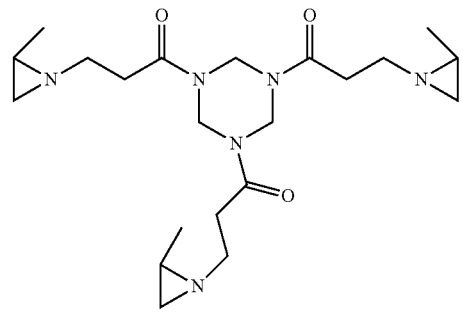 [SMILES: CC1CN1CCC(=O)N1CN(C(=O)CCN2CC2C)CN(C(=O)CCN2CC2C)C1]

In some embodiments the polyaziridine compound may comprise alkylene oxide repeat units, such as ethylene oxide repeat units. The number of alkylene oxide (e.g. ethylene oxide) repeats units is typically at least 2 or 3 and typically no greater than about 20. In some embodiments, the number of alkylene oxide (e.g. ethylene oxide) repeat units averages about 6, 7, 8, or 9. One representative of this type is as follows.

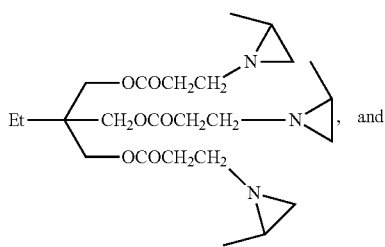

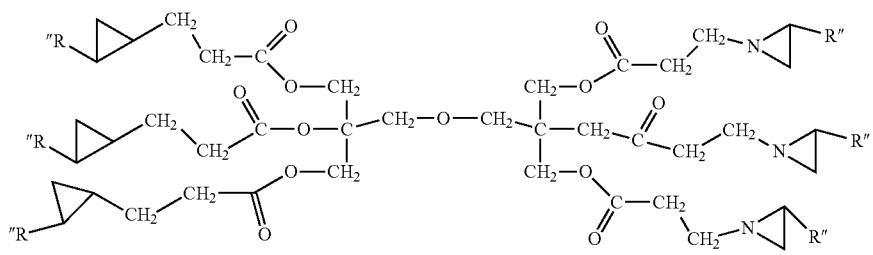

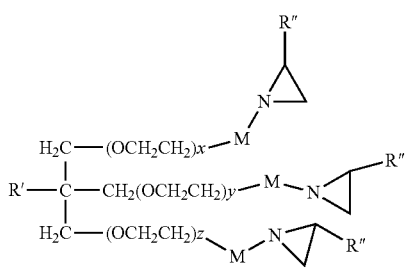

wherein with respect to this aziridine compound
R' is hydrogen or a $C_1$-$C_4$ alkyl;
R" is hydrogen or a $C_1$-$C_4$ alkyl (e.g. methyl);
x, y, and z are independently at least 1; and
M is a bond, divalent atom, or divalent linking group.

In some embodiments, the sum of x+y+z is at least 3, 4, 5, or 6. Further the sum of x+y+z is typically no greater than 20. In some embodiments, M is a covalent bond or a $C_1$-$C_4$ alkylene.

Other polyaziridine compounds comprising alkylene oxide repeat units are described in U.S. Pat. No. 8,017,666; incorporated herein by reference.

In other embodiments, the aziridine compound is an aziridine alkoxy silane compound, also referred to as aziridinyl siloxanes. Such compounds are known for examples from U.S. Pat. No. 3,243,429; incorporated herein by reference. Aziridine alkoxy silane compounds may have the general structure:

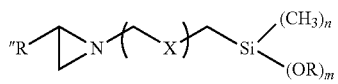

wherein with respect to this aziridine compound
X is a bond, a divalent atom, or a divalent linking group;
R" and R are independently hydrogen or a $C_1$-$C_4$ alkyl (e.g. methyl);
n is 0, 1 or 2;
m is 1, 2, or 3; and
and the sum or n+m is 3.

One representative compound is 3-(2-methylaziridinyl) ethylcarboxylpropyltriethoxysilane.

In some embodiments, the functionalization compound is an organosilane compound. The organosilane compound comprises at least one hydroxy-reactive group such as epoxy, amine, or halogen (e.g. Cl) and an alkoxysilane group.

Suitable alkoxy silanes typically have the following chemical formula:

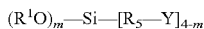

wherein $R^1$ is independently $C_1$-$C_4$ alkyl;
$R_5$ is alkylene, arylene, or alkarylene;
Y is a hydroxy-reactive group; and
m ranges from 1 to 3, and is typically 2 or 3.

In some embodiments, $R_5$ is $(CH_2)_n$ wherein n ranges from 0 to 12, or n ranges from 0 to 3, or n is 2 or 3. In some embodiments, $R^1$ methyl or ethyl;

Illustrative compounds include for example 3-chloropropyltrimethoxysilane, 3-chloropropyltriethoxysilane, p-chloromethylphenyltrimethoxysilane, 3-glycidoxypropyl trimethoxysilane, 3-glycidoxypropyl triethoxysilane, 3-aminopropyltrimethoxysilane (SILQUEST A-1110), 3-aminopropyltriethoxysilane (SILQUEST A-1100), 3-(2-aminoethyl)aminopropyltrimethoxysilane (SILQUEST A-1120), SILQUEST A-1130, (aminoethylaminomethyl) phenethyltrime-thoxysilane, (aminoethylaminomethyl) phenethyltriethoxysilane, N-(2-aminoethyl)-3-aminopropylmethyldimethoxysilane (SILQUEST A-2120), bis-(.gamma.-triethoxysilylpropyl) amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane-, p-(2-aminoethyl)phenyltrimethoxysilane, 3-aminopropyltris (methoxyethoxye-thoxy)silane, 3-aminopropylmethyldiethoxysilane, oligomeric aminosilanes such as DYNASYLAN 1146, 3-(N-methylamino)propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, 3-aminopropyldimethylethoxysilane.

One illustrative reaction scheme of the functionalization of the hydroxy substituent of the aromatic group of the polyester polymer with a silane compound is depicted as follows:

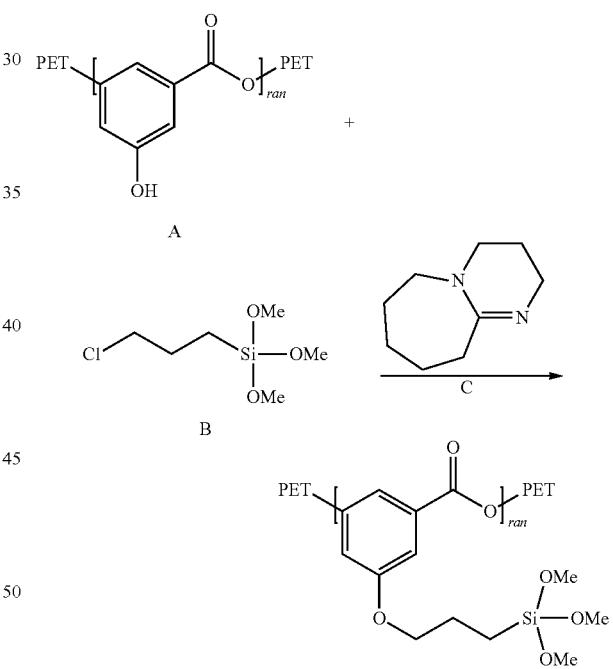

Alkoxy silane adhesion promoting groups are surmised to provide improved adhesive to siliceous surfaces such as glass.

In some embodiments, the functionalization compound is an ethylenically unsaturated compound comprising at least one hydroxy-reactive group such as epoxy, and an ethylenically unsaturated group such as (meth)acrylate, (meth)acrylamide, and vinyl. Suitable functionalization compounds include for example glycidyl (meth)acrylate.

One illustrative reaction scheme of the functionalization of the hydroxy substituent of the aromatic group of the polyester polymer with an ethylenically unsaturated compound is depicted as follows:

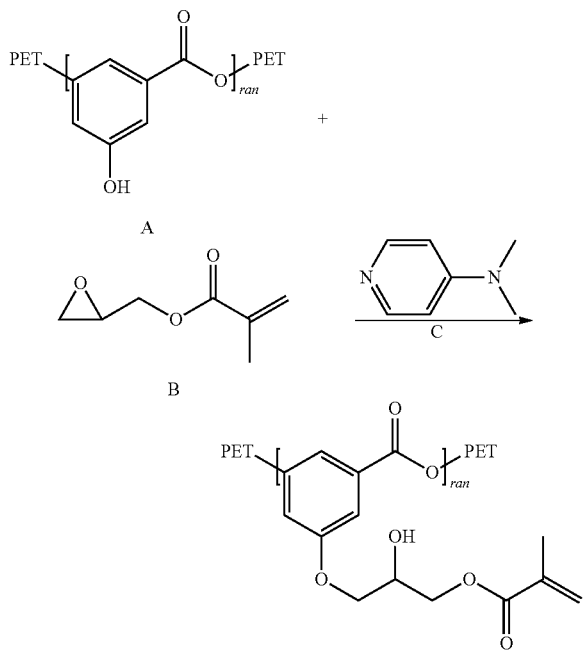

Ethylenically unsaturated adhesion promoting groups are surmised to provide improved adhesive to ethylenically unsaturated polymerizable resin compositions.

Polymeric substrates may be prepared from the functionalized polyester polymer described herein. Such substrates may be of any shape, form, or size (e.g. film, sheet, shaped article). The functionalized polyester polymer is typically thermoplastic. Polymeric films may be prepared by known techniques including casting or melt extrusion.

The functionalized polyester polymer is also suitable for use as a primer for various substrates.

In some embodiments, a primer layer is provided by dissolving the functionalized polyester polymer in an aqueous or organic solvent (e.g. propylene glycol ether acetate), coating the solution onto a substrate, and drying the coating to evaporate the aqueous or organic solvent.

The thickness of the dried primer layer is typically at least 100, 150, 200, 250, or 300 nm and no greater than 600, 700, 800, 900, or 1000 nm. However, when the functionalized polyester polymer is utilized for other purposes the thickness may range up to 1, 2, 3, 4, or 5 mils (1250 microns) or greater.

The substrate may include an inorganic substrate, such as a metal or an inorganic glass, or an organic substrate, such as a fluoropolymer or a non-fluorinated polymer. Alternatively, the substrate may be an organic-inorganic composite. The metal may be copper or stainless steel. The inorganic glass may be a silicate. The non-fluorinated polymer may be a polyamide, a polyolefin, a polyurethane, a polyester, a polyimide, a polyimide, a polystyrene, a polycarbonate, a polyketone, a polyurea, a polyacrylate, and a polymethylmethacrylate, or a mixture thereof. For example, the non-fluorinated polymer may be a non-fluorinated elastomer, such as acrylonitrile butadiene (NBR), butadiene rubber, chlorinated and chlorosulfonated polyethylene, chloroprene, ethylene-propylene monomer (EPM) rubber, ethylene-propylene-diene monomer (EPDM) rubber, epichlorohydrin (ECO) rubber, polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers include ELVAX™ available from E.I DuPont de Nemours Co., Wilmington, Del.

In some embodiments, the substrate comprises or consists of a fluoropolymer. Fluoropolymers are general derived from one or more fluorinated monomer(s) such as tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), perfluorovinyl ethers (including perfluoroallyl vinyl ethers and perfluoroalkoxy vinyl ethers), perfluoroallyl ethers (including perfluoroalkyl allyl ethers and perfluoroalkoxy allyl ethers), perfluoroalkyl vinyl monomers, and combinations thereof.

In some embodiments, the fluoropolymer is formed from the constituent monomers known as tetrafluoroethylene ("TFE"), hexafluoropropylene ("HFP"), and vinylidene fluoride ("VDF," "VF2,"). The monomer structures for these constituents are shown below:

$$\text{TFE: } CF_2=CF_2 \tag{1}$$

$$\text{VDF: } CH_2=CF_2 \tag{2}$$

$$\text{HFP: } CF_2=CF-CF_3 \tag{3}$$

The fluoropolymers preferably comprise at least two of the constituent monomers (HFP and VDF), and more preferably all three of the constituents monomers in varying molar amounts. Additional monomers not depicted in (1), (2) or (3) but also useful include perfluorovinyl ether monomers of the general structure $CF_2=CF-OR_f$, wherein $R_f$ can be a branched or linear perfluoroalkyl radicals of 1-8 carbons and can itself contain additional heteroatoms such as oxygen. Specific examples are perfluoromethyl vinyl ether, perfluoropropyl vinyl ethers, perfluoro(3-methoxypropyl) vinyl ether. Additional examples are found in Worm (WO 00/12574), assigned to 3M, and in Carlson (U.S. Pat. No. 5,214,100).

Various fluoroplastics and fluoroelastomers are known such as described in U.S. Pat. No. 3,929,934. In some embodiments, the elastomers have the general formula:

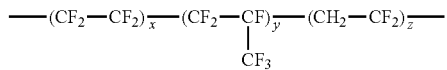

wherein x, y and z are expressed as molar percentages. In some embodiments, x, y, and z are chosen such that the elastomer comprises no greater than 40 or 35 wt.-% TFE, no greater than 25 wt. % HFP and no greater than 70, 65, or 60 wt.-% VDF. In other embodiments, the fluoroelastomer may be a copolymer comprising no more than 80, 70 or 60 wt.-% VDF and no more than 60, 50, or 40 wt.-% HFP.

For improved durability, the fluoropolymer may be polymerized in the presence of a chain transfer agent and/or halogen-containing cure site monomers and/or halogenated endgroups to introduce cure sites into the fluoropolymer. These halogen groups can provide reactivity with the adhesion promoting group and facilitate the formation of the polymer network. Useful halogen-containing monomers are well known in the art and typical examples are found in WO2014/179432.

Optionally halogen cure sites can be introduced into the polymer structure via the use of halogenated chain transfer agents which produce fluoropolymer chain ends that contain reactive halogen endgroups. Such chain transfer agents ("CTA") are well known in the literature and typical examples are: Br—$CF_2CF_2$—Br, $CF_2Br_2$, $CF_2I_2$, $CH_2I_2$. Other typical examples are found in U.S. Pat. No. 4,000,356 to Weisgerber.

In another embodiment, the fluoropolymer can be rendered reactive by dehydrofluorinated by any method that will provide sufficient carbon-carbon unsaturation of the fluoropolymer to create increased bond strength between the fluoropolymer and a hydrocarbon substrate or layer. The dehydrofluorination process is a well-known process to induced unsaturation and it is used most commonly for the ionic crosslinking of fluoroelastomers by nucleophiles such as diphenols and diamines. This reaction is characteristic of VDF containing elastomers. Furthermore, such a reaction is also possible with primary and secondary aliphatic monofunctional amines and will produce a DHF-fluoropolymer with a pendent amine side group.

EXAMPLES

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Materials

| Material | Obtained from |
|---|---|
| Dicarboxylic acids | |
| Terephthalic acid | Sigma-Aldrich Chemical Company, St. Louis, MO |
| Isophthalic acid | Sigma-Aldrich Chemical Company, St. Louis, MO |
| Hydroxy-substituted aromatic compound | |
| 5-Hydroxideisophthalic acid | TCI America, Portland, OR |
| Dimethyl 5-hydroxyisophthalate | Alfa-Aesar, Ward Hill, MA |
| Polyol | |
| Ethylene Glycol (EG) | Sigma-Aldrich Chemical Company, St. Louis, MO |
| Neopentyl Glycol (NPG) | |
| 1,4-Butanediol | |
| Functionalization Compound | |
| Tetra-n-butylphosphonium hydroxide | Alfa-Aesar, Ward Hill, MA |
| 1,8-Diazabicyclo[5.4.0]undec-7-ene (DBU) | Sigma-Aldrich Chemical Company, St. Louis, MO |
| 2-Methylaziridine | Sigma-Aldrich Chemical Company, St. Louis, MO |
| polyfunctional aziridine liquid cross-linker | DSM NeoResins, Inc. Augusta, GA, under trade designation "CX100" |
| 3-(Chloropropyl) trimethoxysilane | Alfa-Aesar, Ward Hill, MA |
| Glycidyl Methacrylate | TCI America, Portland, OR |

| Material | Obtained from |
|---|---|
| Polyester polymer | |
| solvent borne thermoplastic polyester resin | SK Chemical, Korea under trade designation "SKYBON ES-365" |
| thermoplastic, linear saturated co-polyesters solution | Bostik, Inc., Wauwatosa, WI, under trade designation "VITEL 2200B" |
| Antimony (III) Acetate | EMD Millipore, Billerica, MA |
| Sodium Acetate, anhydrous | EMD Millipore, Billerica, MA |
| Zinc Acetate, anhydrous | Alfa-Aesar, Ward Hill, MA |
| Ethanolamine | Alfa-Aesar, Ward Hill, MA |
| Propylene glycol methyl ether acetate | TCI America, Portland, OR |
| Scandium (III) triflate | Alfa-Aesar, Ward Hill, MA |
| 2-Dimethylaminopyridine | Sigma-Aldrich Chemical Company, St. Louis, MO |

Examples 1-1 to 1-6

Synthesis of Polyester Polymer Intermediate
Polyester Polymer Intermediate 1-1

| Compound | | MW (g/mol) | Amount (g) | mol | Wt % |
|---|---|---|---|---|---|
| 5-Hydroxideisophthalic Acid | A | 182.13 | 20 | 0.1098 | — |
| Ethylene Glycol | B | 62.07 | 36.51 | 0.5882 | — |
| Sodium Acetate | C | 82.03 | 0.1 | $1.22 \times 10^{-3}$ | — |
| Reaction Product Mixture of A & B | D | — | 8.3 | — | 10 |
| SKYBON ES-365 | E | 40,000 | 23.4 g | — | 90 |
| Antimony(III) Acetate | F | 298.89 | 0.0333 | — | 0.04 |

A, B, and C were mixed in a single-neck round bottom flask and stirred at 190° C. for 3 hrs. Azeotropic distillation with p-Xylene gave a mixture (D) of the following diacid, monoacid, and diol.

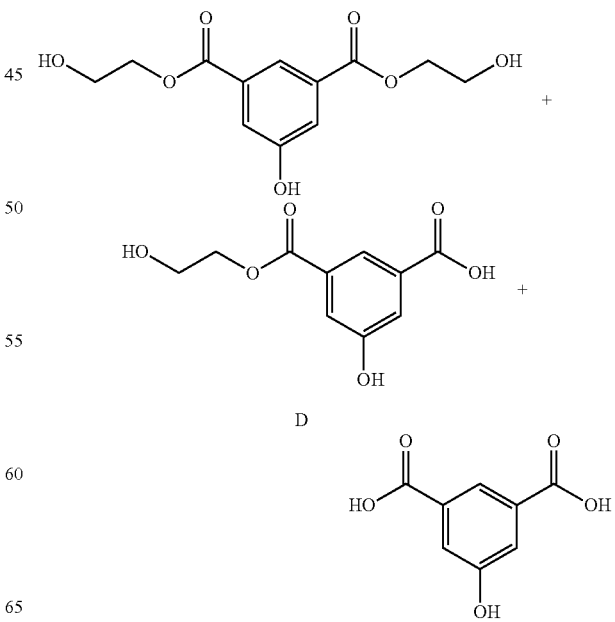

A round bottom flask fitted with a mechanical stirrer was charged with D, E, and F. Mixture was melted and stirred for 2 hrs at 230° C. under nitrogen and 2 hrs at 230° C. under vacuum. Polymer resin was produced and used for post-functionalization. Polymer structure was characterized with NMR, GPC, TGA, and DSC.

According to NMR results, the transesterification reaction was successful for incorporation of the monomers. 4.1% of isophthalate phenol group was incorporated into the polyester resin. The quantitative amount of each monomer in the polyester was calculated and shown below Table 1.

TABLE 1

| Composition of polyester in relative mole %. | | | | | |
|---|---|---|---|---|---|
| Terephthalate | Isophthalate | sebacic acid | EG | NPG | isophthalate-phenol |
| 23.7% | 8.4% | 13.2% | 27.4% | 23.3% | 4.1% |

Polyester Polymer Intermediate 1-2

| Compound | | MW (g/mol) | Amount (g) | mol | Wt % |
|---|---|---|---|---|---|
| 5-Hydroxideisophthalic Acid | A | 182.13 | 6.37 | 0.035 | — |
| 1,4-Butanediol | B | 90.12 | 3.15 | 0.035 | — |
| Vitel 2200B | C | 47,500 | 85.72 | — | 90 |
| Antimony(III) Acetate | D | 298.89 | 0.04 | 0.134 × 10⁻³ | 0.04 |

A round bottom flask fitted with a mechanical stirrer was charged with A, B, C, and D. Mixture was melted and stirred for 1 hr at 210° C. under nitrogen, 1 hr at 210° C. under vacuum, and 1 hr at 230° C. under vacuum. Polymer resin was produced and used for post-functionalization.

Polyester Polymer Intermediate 1-3

*[structure of polymer with isophthalamide units and OR group]*

| Compound | | MW (g/mol) | Amount (g) | mol | Wt % |
|---|---|---|---|---|---|
| Dimethyl 5-hydroxy-isophthalate | A | 210.18 | 42 | 0.20 | — |
| Ethanolamine | B | 61.08 | 48 | 0.79 | — |
| Reaction Product of A & B | C | 268.27 | 8.3 | 0.222 | 10 |
| SKYBON ES-365 | D | 40,000 | 74.7 | 0.626 | 90 |
| Antimony(III) Acetate | E | 298.89 | 0.0333 | 0.50E−3 | 0.04 |

A and B were mixed in a round bottom flask and stirred at 140° C. for 5 hr. Condensed MeOH was received in a Dean Stark Receiver. Product C, depicts as follows, was recrystallized in EtOH and dried in the oven. Powder was produced and used for polymer modification.

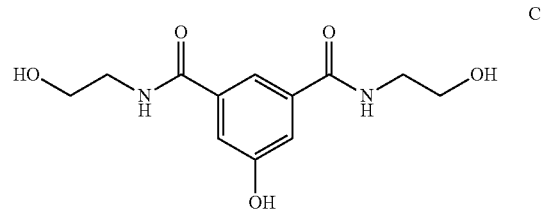 [SMILES: O=C(NCCO)c1cc(O)cc(C(=O)NCCO)c1]

A round bottom flask with a mechanical stirrer was charged with A, B, C, and D. Mixture was melted and stirred for 1 hr at 210° C. under nitrogen, 1 hr at 210° C. under vacuum, and 2 hr at 230° C. under vacuum. Polymer resin was produced and used for post-functionalization.

Polyester Polymer Intermediate 1-4

| Compound | | Mw (g/mol) | Amount (g) | mol | Wt % |
|---|---|---|---|---|---|
| Terephthalic acid | A | 166.13 | 23 | | |
| Isophthalic acid | B | 166.13 | 22.8 | 0.055 | |
| 5-Hydroxideisophthalic Acid | C | 182.13 | 10 | | |
| Ethylene Glycol (EG) | D | 62.07 | 30 | | |
| Neopentyl Glycol (NPG) | E | 104.15 | 24 | | |
| Zinc acetate | Zn(OAc)₂ | 183.48 | 0.13 | | |
| Antimony(III) Acetate | Sb(OAc)₃ | 298.89 | 0.06 | | |

A, B, C, E, Zn(OAc)₂ and Sb(OAc)₂ were mixed in a 500 ml three necked flask equipped with mechanical stirring. The melt solution was stirred at 190° C. for 2 hrs. Then temperature was raised to 240° C. for 1 hr and pressure reduced to 50 torr (6.666 kPa) at 240° C. for 2 hrs. Polyester Polymer Intermediate 1-4 can be functionalized in the same manner as polyester polymers "SKYBON ES-365" and "VITEL 2200B" as will subsequently be described.

Example 2-1 to 2-10—Functionalization of Polyester Polymer Intermediate

Example 2-1

| Compound | | MW (g/mol) | Amount (g) | mol | Wt % |
|---|---|---|---|---|---|
| Polyester Polymer Intermediate 1-1 | A | — | 0.5 | | 5 |
| Propylene glycol methyl ether acetate | PMA | — | 9.5 | — | |
| Tetra-n-butylphosphonium hydroxide (40% w/w aq. soln.) | B | 276.44 | 0.0802 | 0.1935 × 10⁻³ | — |

In a vial, A was dissolved in propylene glycol methyl ether acetate (PMA). Then B was added and stirred at room temperature. The solution was used for coating and lamination.

Example 2-2

| Compound | | MW (g/mol) | Amount (g) | mol | Wt % |
|---|---|---|---|---|---|
| Polyester Polymer Intermediate 1-1 | A | — | 0.5 | — | 5 |

-continued

| Compound | | MW (g/mol) | Amount (g) | mol | Wt % |
|---|---|---|---|---|---|
| Propylene glycol methyl ether acetate | PMA | — | 9.5 | — | — |
| 1,8-Diazabicyclo[5.4.0]undec-7-ene (DBU) | B | 152.24 | 0.0295 | $0.1935 \times 10^{-3}$ | — |

In a vial, A was dissolved in PMA. Then B was added and stirred at room temperature. The solution was used for coating and lamination.

Example 2-3

| Compound | | MW (g/mol) | Amount (g) | mol | Wt % |
|---|---|---|---|---|---|
| Polyester Polymer Intermediate 1-1 | A | — | 0.5 | — | 5 |
| Propylene glycol methyl ether acetate | PMA | — | 9.5 | — | — |
| 2-methylaziridine | B | 57.10 | 0.011 (Actual 0.035) | $0.1935 \times 10^{-3}$ | — |
| Scandium(III) triflate | C | 492.16 | 0.0095 | $0.1935 \times 10^{-4}$ | — |

In a vial, A was dissolved in PMA. Then B and C were added and placed in the 50° C. oven for 8 hrs. The solution was used for coating and lamination.

Example 2-4

| Compound | | MW (g/mol) | Amount (g) | mol | Wt % |
|---|---|---|---|---|---|
| Polyester Polymer Intermediate 1-1 | A | — | 0.5 | — | 5 |
| Propylene glycol methyl ether acetate | PMA | — | 9.5 | — | — |
| CX100 | B | 467.60 | 0.0301 | $0.1935 \times 10^{-3}$ | — |

In a vial, A was dissolved in PMA. Then B was added and stirred at room temperature. The solution was used for coating and lamination.

Example 2-5

| Compound | | MW (g/mol) | Amount (g) | mol | Wt % |
|---|---|---|---|---|---|
| Polyester Polymer Intermediate 1-1 | A | — | 0.5 | — | 5 |
| Propylene glycol methyl ether acetate | PMA | — | 9.5 | — | — |
| 3-(Chloropropyl) trimethoxysilane | B | 198.72 | 0.053 | $0.1935 \times 10^{-3}$ | — |
| DBU | C | 152.24 | 0.0353 | $0.2322 \times 10^{-3}$ | — |

In a vial, A was dissolved in PMA. Then B and C were added and placed in the 80° C. oven overnight.

Example 2-6

| Compound | | MW (g/mol) | Amount (g) | mol | Wt % |
|---|---|---|---|---|---|
| Polyester Polymer Intermediate 1-1 | A | — | 0.5 | — | 5 |
| 3-Glycidoxy propyl-trimethoxysilane | B | 236.34 | 0.0457 | $0.1935 \times 10^{-3}$ | — |
| 2-Dimethylaminopyridine | C | 122.17 | 0.0236 | $0.1935 \times 10^{-3}$ | — |
| Propylene glycol methyl ether acetate | PMA | — | 9.5 | — | — |

In a vial, A was dissolved in PMA. Then B and C were added and placed in the 100° C. oven overnight.

Example 2-7

| Compound | | MW (g/mol) | Amount (g) | mol | Wt % |
|---|---|---|---|---|---|
| Polyester Polymer Intermediate 1-1 | A | — | 0.5 | — | 5 |
| Glycidyl Methacrylate | B | 142.15 | 0.0257 | $0.1935 \times 10^{-3}$ | — |
| 2-Dimethylaminopyridine | C | 122.17 | 0.0236 | $0.1935 \times 10^{-3}$ | — |
| Propylene glycol methyl ether acetate | PMA | — | 9.5 | — | — |

In a vial, A was dissolved in propylene glycol methyl ether acetate (PMA). Then B and C were added and placed in the 100° C. oven overnight.

Example 2-8

| Compound | | MW (g/mol) | Amount (g) | mol | Wt % |
|---|---|---|---|---|---|
| Polyester Polymer Intermediate 1-2 | A | — | 0.5 | — | 5 |
| Tetra-n-butylphosphonium hydroxide (40% w/w aq, soln) | B | 276.44 | 0.0802 | $0.1935 \times 10^{-3}$ | — |
| Propylene glycol methyl ether acetate | PMA | — | 9.5 | — | — |

In a vial, A was dissolved in propylene glycol methyl ether acetate (PMA). Then B was added and stirred at room temperature. The solution was used for coating and lamination.

Example 2-9

| Compound | | MW (g/mol) | Amount (g) | mol | Wt % |
|---|---|---|---|---|---|
| Polyester Polymer Intermediate 1-3 | A | — | 0.5 | — | 5 |
| Tetra-n-butylphosphonium hydroxide (40% w/w aq, soln) | B | 276.44 | 0.0802 | $0.1935 \times 10^{-3}$ | — |
| Propylene glycol methyl ether acetate | PMA | — | 9.5 | — | — |

In a vial, A was dissolved in propylene glycol methyl ether acetate (PMA). Then B was added and stirred at room temperature. The solution was used for coating and lamination.

Example 2-10

| Compound | | MW (g/mol) | Amount (g) | mol | Wt % |
|---|---|---|---|---|---|
| Polyester Polymer Intermediate 1-3 | A | — | 0.5 | — | 5 |
| CX100 | B | 467.60 | 0.0301 | 0.1935 × 10$^{-3}$ | — |
| Propylene glycol methyl ether acetate | PMA | — | 9.5 | — | — |

In a vial, A was dissolved in propylene glycol methyl ether acetate (PMA). Then B was added and stirred at room temperature. The solution was used for coating and lamination.

Example 2-11—Incorporation of Functionalized Aromatic Monomer into Polyester Polymer

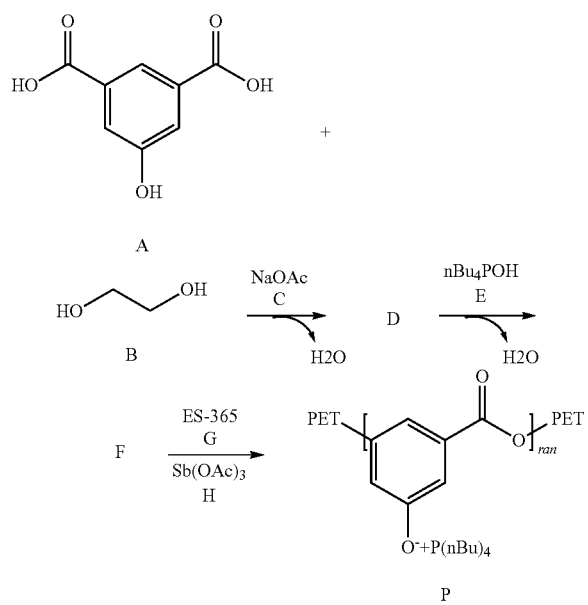

| Compound | | MW (g/mol) | Amount (g) | mol | Wt % |
|---|---|---|---|---|---|
| 5-Hydroxideisophthalic Acid | A | 182.13 | 20 | 0.1098 | — |
| Ethylene Glycol | B | 62.07 | 36.51 | 0.5882 | — |
| Sodium Acetate | C | 82.03 | 0.1 | 1.22E-3 | — |
| Mixture of diol, monoacid, and diacid | D | — | — | — | — |
| Tetra-n-butylphosphonium hydroxide (40% w/w aq, soln.) | E | 276.44 | 30.353 | 0.1098 | — |
| — | F | — | 2.6 | — | 10 |
| SKYBON ES-365 | G | 40,000 | 74.7 | — | 90 |
| Antimony(III) Acetate | H | 298.89 | 0.0333 | — | 0.04 |

A, B, and C were mixed in a round bottom flask and stirred at 190° C. for 2 hrs. Azeotropic distillation with p-Xylene for 1 hr 30 min gave a product D as a liquid. Then, E was added and stirred at 190° C. for 1 hr. The reaction was allowed to cool down. Product F was dried in the 80° C. oven overnight. Viscous gel type liquid was produced.

A round bottom flask with a mechanical stirrer was charged with F, G, and H. Mixture was melted and stirred for 2 hrs at 230° C. under nitrogen and 1 hr at 230° C. under vacuum. Polymer resin was produced and used for coating and lamination. Polymer was characterized by NMR, GPC, TGA, and DSC.

The transesterification reaction was successful for incorporation of the monomers while the level of incorporation of monomer was lower than the theoretical level. While not wishing to be bound by theory, this was perhaps because of the formation of the phosphonium salt at the acid position inhibited transesterification. The quantitative amount of each monomer in the polyester was calculated and listed in Table 2.

TABLE 2

| Composition of polyester in relative mole %. | | | | | | |
|---|---|---|---|---|---|---|
| Terephthalate | Isophthalate | sebacic acid | EG | NPG | isophthalatephenol | PBu$_4$ |
| 24.3% | 8.7% | 13.3% | 27.4% | 23.3% | 1.3% | 1.7% |

Examples 4-12 and Comparative Examples A-C

To prepare Examples 4-11, functionalized polyester solutions as described above were coated using a #4 Meyer bar onto a PET film (without any primers) and dried in a 120° C. oven for 15 min resulting is a dried primer thickness of 300-600 nm. The coated films showed excellent adhesion to PET substrates. The Coated PET films were then laminated with THV 610 or THV 612 (obtained from 3M Company, St. Paul, Minn. under trade designations "3M DYNEON FLUOROPLASTIC THV 610" and "3M DYNEON FLUOROPLASTIC THV 612", respectively) below at 190° C. and 40 psi (0.276 MPa) for about 10 min by using an impulse heat sealer obtained from Sencorp Systems Inc., Hyannis, Mass. The functionalized polyester solutions as well as the THV films used for each of Examples 4-11 are summarized in Table 3, below.

TABLE 3

| Example | THV Film Used | Functionalized Polyester Primer Used |
|---|---|---|
| Example 4 | THV 610 | Example 2-1 |
| Example 5 | THV 612 | Example 2-1 |
| Example 6 | THV 612 | Example 2-4 |
| Example 7 | THV 612 | Example 2-4 |
| Example 8 | THV 612 | Example 2-3 |
| Example 9 | THV 612 | Example 2-8 |
| Example 10 | THV 612 | Example 2-9 |
| Example 11 | THV 612 | Example 2-10 |

Comparative Example A was a laminate of bare PET film and THV 610 film prepared as described above. Comparative Example B was a laminate of THV 610 film and a PET film coated with SKYBON ES-365 prepared as described above. Comparative Example C was a laminate of THV 610 film and a PET film coated with phenolic polyester prepared in Example 1-2 prepared as described above.

Laminated Example 4-11 and Comparative Examples A-D films were used for T-peel test as described below. To perform T-peel test, a strip of 0.5 inch wide and at least 1.5 inch length (1.27 cm wide and at least 3.8 cm long) of the above laminate was prepared for each Example. For each sample, the PET and THV layer was placed in an opposed clamp of an INSTRON tester (Model 1122, obtained from Instron, Norwood, Mass.)). Peel strength was measured at 1 inch (2.54 cm) jaw spacing and cross-head speed of 101.6 millimeters/minute. T-Peel test data for Comparative Examples A-C and Examples 4-11 is summarized in Table 4.

TABLE 4

| Example | Peel Strength (N/cm) | | |
|---|---|---|---|
| | 1st measurement | $2^{nd}$ measurement | $3^{rd}$ measurement |
| Comp. Ex. A | Lamination failed | N/M | N/M |
| Comp. Ex. B | Delaminated immediately | N/M | N/M |
| Comp. Ex. C | Delaminated immediately | N/M | N/M |
| Ex. 4 | 5.6 | N/M | N/M |
| Ex. 5 | 4.8 | 3.6 | 2.9 |
| Ex. 6 | 4.7 | 4.0 | 2.5 |
| Ex. 7 | 4.2 | 4.8 | 3.6 |
| Ex. 8 | 4.0 | 3.7 | Delaminated |
| Ex. 9 | Excellent adhesion was observed# | | |
| Ex. 10 | Excellent adhesion was observed# | | |
| Ex. 11 | Excellent adhesion was observed# | | |

*N/M means not measured
No T-peel test

Example 12—Polyester Intermediate 1-5 and Functionalization

A diol was formed by reacting equal amounts by weight of 5-hydroxideisophthalic acid and ethylene glycol along with 0.04 wt-% of sodium acetate. The diol (10 wt-%) was combined with a 20 wt/wt % solids water-based dispersion of a sulfopolyester polymer and 1.36 wt.-% of antimony acetate. The sulfopolyester contained 5.5 mol % of 5-sodiosulfoisophthalic acid, 47.5 mol % of terephthalic acid, 47.5 mol % isophthalic acid, 25.1 mol % ethylene glycol, 74.9 mol % neopentyl glycol, antimony oxide at a concentration of 313 ppm of the total polyester, and sodium acetate at a concentration of 541 ppm of the total polyester. The wt-% of each of the component in the sulfopolyester were as follows:

| Monomers | Wt % of Composition |
|---|---|
| terephthalic acid | 27.35% |
| isophthalic acid | 27.04% |
| 5-sodiosulfpisophthalic acid | 5.62% |
| ethylene glycol | 6.56% |
| neopentyl glycol | 33.35% |
| sodium acetate | 0.05% |
| antimony triacetate | 0.03% |

The reaction was mixture was heated under agitation to 250° C. at 345 kPa (50 psig) under a nitrogen blanket for 2.5 hours. By-product water was evolved and removed from the reactor via a batch rectification column, while the ethylene glycol was refluxed down the column and back into the batch. After water by-product was removed from the reaction medium, the pressure was reduced to atmospheric pressure (0 psig) at a controlled rate and the batch temperature was increased to 275° C. While the batch temperature was increased, vacuum was applied to the reaction medium (<6 mbar). During a period of 1 hour the material increased in viscosity the sulfopolyester was heated to 280° C. under full vacuum and agitation for 2 hours. As the sulfopolyester viscosity increased the agitator speed dropped, while maintaining a constant power-draw on agitator.

Polyester Polymer Intermediate 1-5 was dissolved in propylene glycol methyl ester acetate (PMA). Tetra-n-butylphosphonium hydroxide (TBPH) was added and stirred as room temperature. The functionalized polyester polymer was coated onto PET film, dried and laminated to THV612 as previously described resulting in a dried primer thickness of 300-600 nm. The bond strength (N/cm) was evaluated in the same manner. The lamination conditions and test results are as follows:

| Sample | Lamination at 190° C. | | | Lamination at 120° C. | |
|---|---|---|---|---|---|
| | 5 min | 3 min | 1 min | 5 min | 3 min |
| 12-1 (7.4 wt.-% TBPH) | 3.3 | 3.4 | 3.2 | 1.0 | 0.5 |
| 12-2 (14 wt.-% TBPH) | 4.3 | 3.3 | 3.2 | 2.6 | 1.9 |
| 12-3 (19 wt.-% TBPH) | 3.7 | 3.6 | 3.4 | 0.5 | 0.1 |
| 12-4 (24 wt.-% TBPH) | 3.3 | 3.1 | 3.1 | 2.5 | 1.4 | wt.-% TBPH based on the total weight of sulfopolyester polymer

Polyester Polymer Intermediate 1-5 was dissolved in propylene glycol methyl ether acetate (PMA). CX-100 was added and stirred as room temperature.

The functionalized polyester polymer was coated onto PET film, dried and laminated to THV612 as previously described resulting in a dried primer thickness of 300-600 nm. The bond strength (N/cm) was evaluated in the same manner. The lamination conditions and test results are as follows:

| Sample | Lamination at 190° C. | | |
|---|---|---|---|
| | 5 min | 3 min | 1 min |
| 12-5 (7.4 wt.-% CX100) | 2.5 | 1.8 | 1.6 |
| 12-6 (14 wt.-% CX100) | 2.2 | 2.4 | 1.6 |
| 12-7 (19 wt.-% CX100) | 1.3 | 1.1 | 1.1 |
| 12-8 (24 wt.-% CX100) | 1.1 | 1.2 | 1.8 | wt.-% CX100 based on the total weight of sulfopolyester polymer

What is claimed is:

1. A polyester polymer comprising polymerized units having the structure

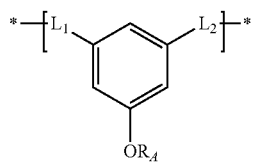

wherein $L_1$ and $L_2$ are independently divalent linking groups comprising an ester group; and
$R_A$ is an adhesion promoting group bonded to the oxygen atom by means of an ionic or covalent bond and $R_A$ comprises an organophosphonium cation, a N-heterocyclic cation, or an aziridine group.

2. The polyester polymer of claim 1 wherein the polyester polymer is a sulfopolyester.

3. A polyester film comprising the polyester polymer of claim 1.

4. A polyester polymer comprising polymerized units having the structure

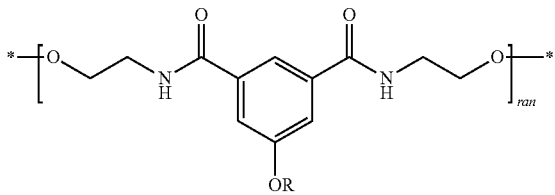

R is an adhesion promoting group ($R_A$) bonded to the oxygen atom by means of an ionic or covalent bond.

5. The polyester polymer of claim 4 wherein $R_A$ comprises a cation of a salt of a base, an organophosphonium cation, a N-heterocyclic cation, an amine, an aziridine group, an alkoxy silane group, an ethylenically unsaturated group, or a (meth)acrylic group.

6. The polyester polymer of claim 4 wherein the polyester polymer is a sulfopolyester.

7. A film comprising a primer layer, the primer layer comprising a polyester polymer having the structure

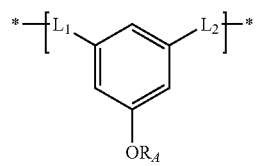

wherein $L_1$ and $L_2$ are independently divalent linking groups comprising an ester group; and $R_A$ is an adhesion promoting group bonded to the oxygen atom by means of an ionic or covalent bond, wherein $R_A$ comprises a cation of a salt of a base, an organophosphonium cation, a N-heterocyclic cation, an amine, an aziridine group, an alkoxy silane group, an ethylenically unsaturated group, or a (meth)acrylic group.

8. A laminate comprising the film of claim 7 wherein the primer layer is bonded to a fluorine-containing polymer film.

9. The laminate of claim 8 wherein the fluorine-containing polymer film is a fluoropolymer comprising polymerized units selected from tetrafluoroethylene, vinylidene fluoride and hexafluoropropylene.

* * * * *

UNITED STATES PATENT AND TRADEMARK OFFICE
CERTIFICATE OF CORRECTION

PATENT NO. : 10,160,829 B2
APPLICATION NO. : 15/743939
DATED : December 25, 2018
INVENTOR(S) : Yu Yang et al.

Page 1 of 2

It is certified that error appears in the above-identified patent and that said Letters Patent is hereby corrected as shown below:

In the Specification

Column 2
Line 56, Delete "azelic" and insert -- azelaic --, therefor.

Column 5
Line 2, Delete "sulfonapthalene" and insert -- sulfonaphthalene --, therefor.

Column 9
Line 63 (Approx.), Delete "NaOAC" and insert -- NaOAc --, therefor.

Column 11
Line 13, Delete "Sb(OAC)3" and insert -- Sb(OAc)3 --, therefor.

Column 12
Line 47, Delete "Land" and insert -- L1 and --, therefor.

Column 13
Line 15 (Approx.), Delete "terta" and insert -- tetra --, therefor.

Column 14
Line 5, Delete "compound." and insert -- compound --, therefor.
Lines 6-8, Delete "that comprises at least one aziridine group. In some embodiments, the aziridine compound may comprise 2, 3, 4, 5, 6, or greater than 6 aziridine groups." and insert the same on Column 14, Line 5, as a continuation of the same paragraph.

Signed and Sealed this
Thirtieth Day of July, 2019

Andrei Iancu
*Director of the United States Patent and Trademark Office*

Columns 15-16

Line 39 (Approx.), Delete " 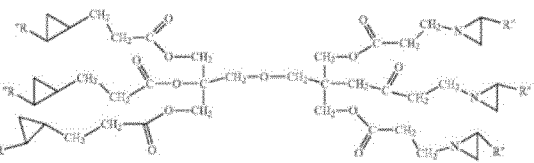 " and insert -- 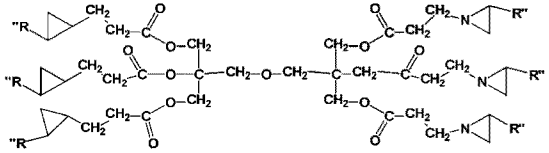 --, therefor.

Column 17
Line 44 (Approx.), Delete "and the" and insert -- the --, therefor.
Line 62, Delete "R1 methyl or ethyl;" and insert -- R1 is methyl or ethyl. --, therefor.

Column 18
Line 4, Delete "phenethyltrime-thoxysilane," and insert -- phenethyltrimethoxysilane, --, therefor.
Line 10 (Approx.), Delete "4-aminobutyltriethoxysilane-," and insert
-- 4-aminobutyltriethoxysilane, --, therefor.
Line 12 (Approx.), Delete "(methoxyethoxye-thoxy)" and insert -- (methoxyethoxyethoxy) --, therefor.

Column 29
Line 8, Delete "Mass.))." and insert -- Mass.). --, therefor.
Line 55 (Approx.), Delete "sodiosulfpisophthalic" and insert -- sodiosulfoisophthalic --, therefor.

Column 30
Line 30, Delete "CX-100" and insert -- CX100 --, therefor.